(12) United States Patent
Knoppert

(10) Patent No.: US 11,433,314 B2
(45) Date of Patent: *Sep. 6, 2022

(54) INFORMATION HANDLING SYSTEM HANDS FREE VOICE AND TEXT CHAT

(71) Applicant: Dell Products L.P., Round Rock, TX (US)

(72) Inventor: Michiel Sebastiaan Emanuel Petrus Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 221 days.

This patent is subject to a terminal disclaimer.

(21) Appl. No.: 16/864,654

(22) Filed: May 1, 2020

(65) Prior Publication Data

US 2021/0339150 A1     Nov. 4, 2021

(51) Int. Cl.
| | |
|---|---|
| *A63F 13/87* | (2014.01) |
| *A63F 13/215* | (2014.01) |
| *A63F 13/2145* | (2014.01) |
| *A63F 13/213* | (2014.01) |

(52) U.S. Cl.
CPC ............ *A63F 13/87* (2014.09); *A63F 13/213* (2014.09); *A63F 13/215* (2014.09); *A63F 13/2145* (2014.09)

(58) Field of Classification Search
CPC .... A63F 13/87; A63F 13/213; A63F 13/2145; A63F 13/215
See application file for complete search history.

(56) References Cited

U.S. PATENT DOCUMENTS

| | | | |
|---|---|---|---|
| 6,909,205 B2 | 6/2005 | Corcoran et al. | |
| 7,394,173 B2 | 7/2008 | Cope et al. | |
| 8,142,273 B2 | 3/2012 | Williams et al. | |
| 8,545,323 B2 | 10/2013 | McVicar et al. | |
| 8,641,531 B2 | 2/2014 | Patil | |
| 2013/0065692 A1* | 3/2013 | Aronzon | A63F 13/216 463/43 |
| 2013/0244784 A1 | 9/2013 | Assa | |

(Continued)

FOREIGN PATENT DOCUMENTS

KR        101157308 B1     2/2006

OTHER PUBLICATIONS

PowerA MOGA Mobile Gaming Clip for Xbox One Wireless Controllers. Amazon.com. Online. Nov. 23, 2019. Accessed via the Internet. Accessed Jan. 29, 2022. <URL: https://www.amazon.com/PowerA-Moga-Mobile-Gaming-Wireless-Controllers/dp/B081C7TLVS/> (Year: 2019).*

*Primary Examiner* — Thomas J Hong
*Assistant Examiner* — Carl V Larsen
(74) *Attorney, Agent, or Firm* — Zagorin Cave LLP; Robert W. Holland

(57) ABSTRACT

A controller selectively couples and de-couples at a rear surface of a portable information handling system and presents gaming content at both an integrated display and a peripheral display. The portable information handling system rests proximate the peripheral display when gaming content is presented at the peripheral display to present a communications interface of the gaming application. An end user manages gaming application communication between individuals and teams with gaze and voice inputs detected at the portable information handling system.

17 Claims, 13 Drawing Sheets

(56) References Cited

U.S. PATENT DOCUMENTS

| | | | |
|---|---|---|---|
| 2013/0303287 A1 | 11/2013 | Woolston | |
| 2014/0228075 A1* | 8/2014 | Baschnagel | H05K 5/0204 |
| | | | 455/575.1 |
| 2014/0368442 A1* | 12/2014 | Vahtola | G06F 3/013 |
| | | | 345/173 |
| 2015/0375106 A1* | 12/2015 | Liu | A63F 13/213 |
| | | | 463/31 |
| 2016/0030835 A1 | 2/2016 | Argiro | |
| 2016/0301639 A1* | 10/2016 | Liu | G06Q 10/107 |
| 2020/0070048 A1* | 3/2020 | Ishii | A63F 13/87 |
| 2021/0339134 A1* | 11/2021 | Knoppert | A63F 13/87 |

* cited by examiner

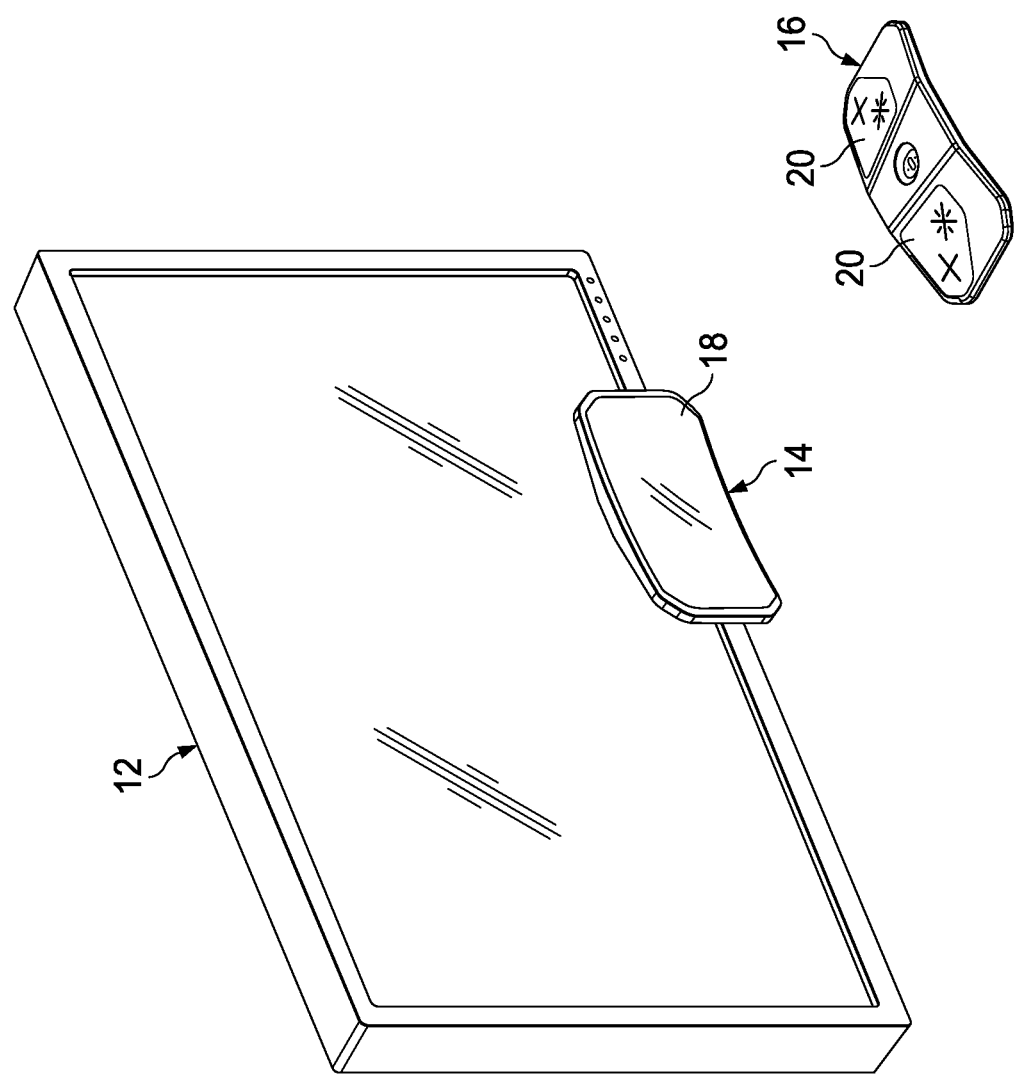

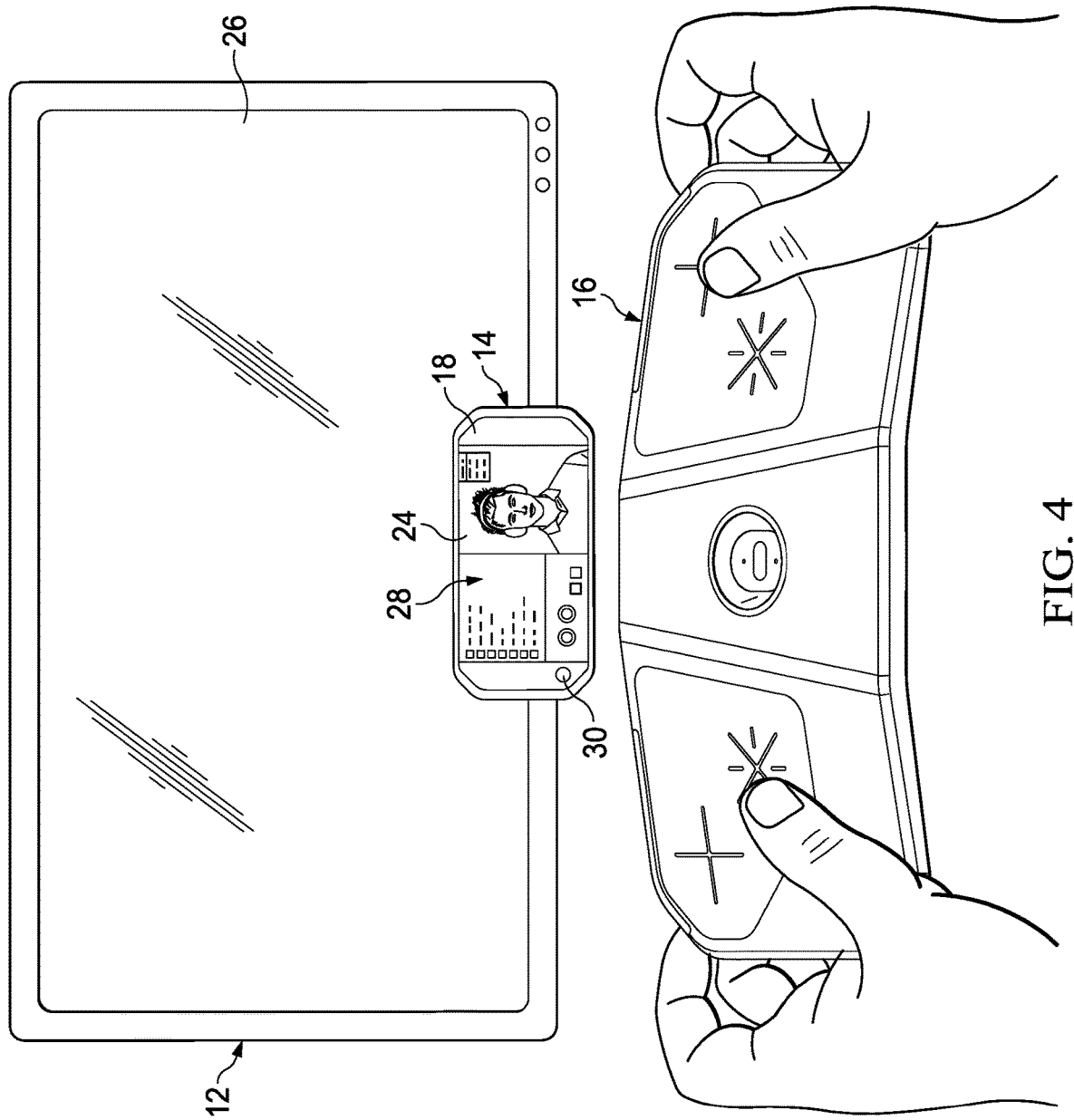

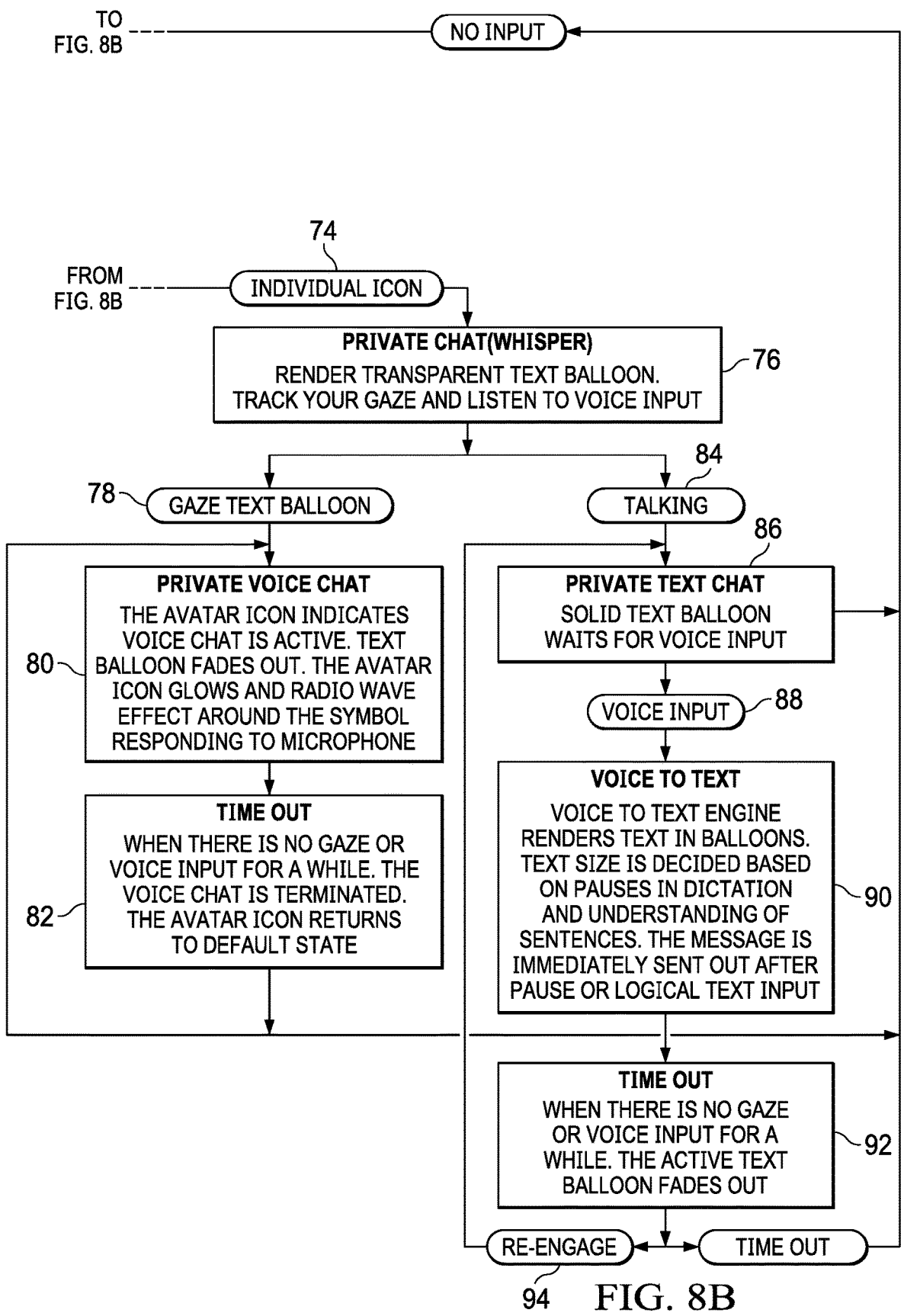

US 11,433,314 B2

INFORMATION HANDLING SYSTEM HANDS FREE VOICE AND TEXT CHAT

CROSS REFERENCE TO RELATED APPLICATION

U.S. patent application Ser. No. 16/864,662, filed May 1, 2020, entitled "Information Handling System Wheel Input Device" by inventor Michiel Sebastiaan Emanuel Petrus Knoppert, describes exemplary methods and systems and is incorporated by reference in its entirety.

U.S. patent application Ser. No. 16/864,671, filed May 1, 2020, entitled "Information Handling System Gaming Controls" by inventor Michiel Sebastiaan Emanuel Petrus Knoppert, describes exemplary methods and systems and is incorporated by reference in its entirety.

BACKGROUND OF THE INVENTION

Field of the Invention

The present invention relates in general to the field of information handling systems communication support, and more particularly to an information handling system hands free voice and text chat.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. End users often find portable information handling systems to be convenient tools for consuming information when on the go. In particular, tablet configurations of portable information handling systems provide a convenient and very portable tool for reading documents, web browsing and simple text interactions, such as e-mail communications. A typical tablet information handling system is built into a planar housing covered on one side by a touchscreen display. The touchscreen display offers a convenient input device that can accept typed inputs through a virtual keyboard presented at the display. Although convenient to use while traveling, the touchscreen display is generally not as convenient for supporting heavier end user interactions, such as typing into a word processing document. In addition, tablet information handling systems tend to have a smaller display area for presenting visual images that can make more intense processing tasks difficult to accomplish. Generally, if an end user needs to perform tasks that call for greater amounts of inputs, the end user will rely on convertible information handling systems that integrate other input devices, such as a keyboard and touchpad. Although this improves an end user's ability to input information, such integrated input devices tend to increase system size and can make the system somewhat awkward to use when mobile.

One specialized type of portable information handling system is a gaming system that executes a gaming application, such as war games, flying games, driving games, etc. . . . . Generally such gaming systems are built into a tablet configuration that includes a touchscreen display to accept touch inputs and sensors that detect the gaming systems movement and orientation, such as accelerometers and gyroscopes, which determine rotation and orientation from plural accelerometers disposed at plural axes. In a typical gaming application, the end user holds the tablet information handling system with both hands so the integrated display is readily visible and performs inputs to the game by changing the system's orientation. For instance, the tablet information handling system becomes a steering wheel that the end user rotates to steer a vehicle with a road or track presented on the integrated display. Some gaming systems also integrate physical push buttons near the end user's grasp points that the end user may interact with to perform gaming functions, such as firing weapons or changing speed. Although this improves gaming interactions, the end user typically must interact with the touchscreen display to perform more complex functions, such as configuration of gaming options. In addition, interactions through the integrated touchscreen display tend to become more difficult while playing the game since the game activity typically must pause. Even performing game inputs can become confusing where movement of the information handling system provides inputs. For instance, turning the tablet information handling system as a wheel disrupts the end user's view of the driving surface, which rotates with the information handling system.

Often gaming applications include a wide variety of operations that can be performed through the integrated display. For instance, many games are played with other end users by communicating gaming information through a network. In some games, end users form teams that play against other teams in a virtual world. Typically in such gaming scenarios end users will communicate with each other using voice and/or text chat. When using only a tablet information handling system these functions often prove difficult to use. To obtain full access to these functions, the end user will project the game content to a peripheral display so that all of the information can be presented. Similarly, end users will use peripheral input devices if available, such as a controller with multiple input devices. These options can provide a more robust gaming experience by leveraging the larger display area offered by a peripheral display and projecting the gaming content with wireless communication, such as Bluetooth or WiFi. Although these gaming options improve the gaming experience when peripheral devices are available, the end user often faces confusion as he adapts to different hardware and input devices.

SUMMARY OF THE INVENTION

Therefore, a need has arisen for a system and method which maintains a portable information handling system display in desired viewing orientation during rotation of the portable information handling system to perform inputs.

A further need exists for a system and method that enhances end user voice and text chat when gaming through a portable information handling system.

A further need exists for a system and method that enhances end user input device interactions when gaming with a portable information handling system.

In accordance with the present invention, a system and method are provided which substantially reduce the disadvantages and problems associated with previous methods and systems. A portable information handling system removeably couples to a controller that enhances end user input options. In one embodiment, the portable information handling system and controller couple at a gimbal motor in a wheel input configuration that allows an end user to rotate the controller for wheel inputs while maintaining the portable information handling system in a desired viewing orientation by counter rotation of the gimbal motor. Controller input devices and portable information handling system settings are managed with posture and gesture controls sensed by accelerometers of the portable information handling system. The controller de-couples from the portable information handling system to provide inputs as a peripheral device. The portable information handling system when de-coupled is supported in a view position by the gimbal motor and presents gaming communication information, such as chat managed by gaze and voice inputs, while gaming content is presented at a peripheral display.

More specifically, a portable information handling system processes information with a central processing unit that executes instructions in cooperation with a memory that stores the instructions and information. For instance, a gaming application presents gaming content at a touchscreen display integrated in the portable information handling system in response to inputs sensed by the portable information handling system. A controller selectively couples and de-couples to the portable information handling system at a gimbal motor. An end user performs wheel inputs at the controller that are applied to the gaming content based upon rotation sensed at the controller and communicated to the portable information handling system. The gimbal motor counter rotates relative to the wheel inputs to hold the integrated display in a predetermined orientation, such as in a horizontal viewing orientation. The controller de-couples from the portable information handling system to act as a peripheral controller that communicates inputs to the portable information handling system, such as through a wireless interface. With the controller de-coupled, the gimbal motor selectively slides out of the rear surface of the portable information handling system to act as a viewing stand. In one embodiment, the portable information handling system presents gaming content at a peripheral display while disposed on the viewing stand to present a communication streaming user interface that allows an end user to perform chat and other functions at the portable information handling system without interruption of gaming content at the peripheral display. End user gaze inputs drive selection of chat options, such as text or voice chat, so that the end user can continue with the gaming application uninterrupted.

The present invention provides a number of important technical advantages. One example of an important technical advantage is that gaming content presented on a portable information handling system integrated display is maintained in a desired viewing orientation during rotational inputs made at a controller coupled to the portable information handling system. As an end user holds the controller and rotates the controller to make wheel inputs, the gimbal motor counter rotates based upon the sensed rotational inputs to hold the integrated display in a constant orientation relative to the end user, such as a horizontal viewing orientation. The end user is able to perform steering inputs while the gaming content view remains in a constant orientation to provide a less confusing presentation. Posture and gestures applied by the end user are sensed so that the end user can quickly manage game settings, such as selection of game functions and adjustments to input devices, such as programing virtual tools to associate with desired push buttons of the controller. An end user can quickly orient to gaming conditions by changing portable information handling system posture from a vertical viewing orientation to a horizontal orientation that initiates a map view. When a peripheral display is available, the end user can de-couple the portable information handling system from the controller to rest near the peripheral display so that gaming content is presented on the peripheral display while the integrated display supports communication or related functions. End user gaming interactions at the peripheral display can continue uninterrupted while the end user performs voice and text chat functions with gaze controls to manage individual and team communications.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts the portable gaming information handling system assembly in use with the portable information handling system de-coupled from the controller;

FIG. 4 depicts an example embodiment of the portable information handling system resting with a stand in front of a peripheral display to provide a streaming communication monitor;

FIGS. 8A and 8B depict a flow diagram of logic to support a hands free voice and text chat through a streaming communication interface at a portable information handling system during presentation of gaming content at a peripheral display;

DETAILED DESCRIPTION

A portable information handing system selectively couples to a controller at a gimbal motor so that the portable information handling system maintains a viewing orientation with the gimbal while an end user rotates the controller. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
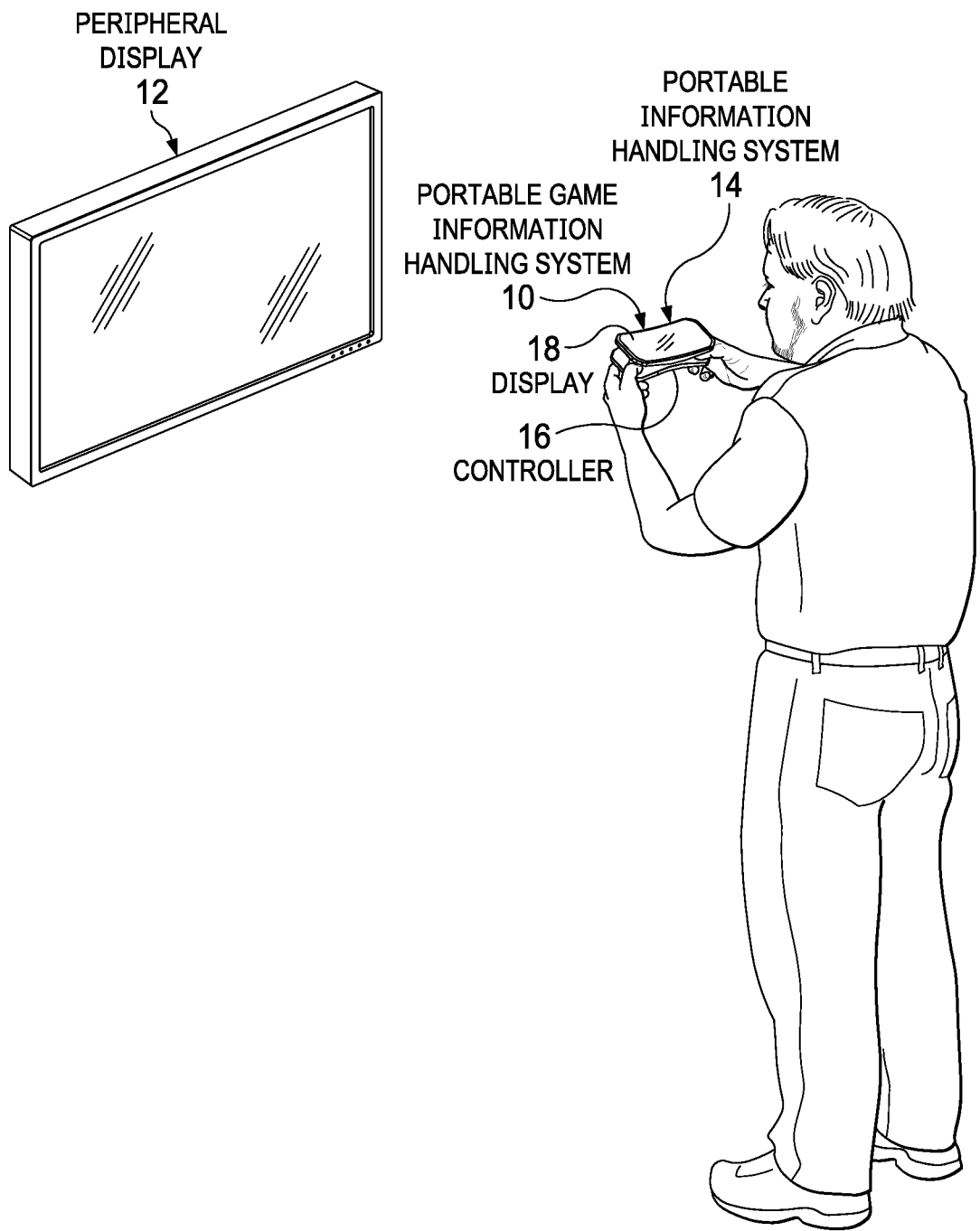
FIG. 1 depicts a portable gaming information handling system assembly in use by an end user and supplemented by a peripheral display.

Referring now to FIG. 1, a portable gaming information handling system assembly 10 is depicted in use by an end user and supplemented by a peripheral display 12. In the example embodiment, an end user grasps portable gaming information handling system assembly 10 at a controller 16 that supports a portable information handling system 14 in a viewing position. The end user makes inputs to portable gaming information handling system assembly 10 through a variety of input devices, including an integrated touchscreen display 18 integrated in an upper surface of portable information handling system 14, touch input button devices on the upper face of controller 16 and gestures implemented through acceleration and/or gyroscopic sensing. Portable information handling system 14 executes an operating system and gaming applications that generate gaming content for the end user to interact with. The gaming content may be presented only at integrated touchscreen display 18, only at peripheral display 12 or simultaneously at both integrated touchscreen display 18 and peripheral display 12. As described in greater detail below, in one example embodiment, communication stream content may be presented as part of the gaming content and managed with portable information handling system 14. Various input devices and content presentations may be used based upon the selectively-available physical configurations of portable gaming information handling system 10 as described below.

Referring now to FIG. 2, the portable gaming information handling system assembly 10 is depicted in use with portable information handling system 14 de-coupled from controller 16. In the example embodiment, controller 16 decouples from the bottom surface of information handling system 14 so that an end user can hold controller 16 separately to make inputs to portable information handling system 14, such as through Bluetooth, WiFi or other wireless signals. Controller 16 has input devices 20 disposed at an upper surface, such as push input buttons, which accept end user inputs for communication to portable information handling system 14 for presentation at display 18. Various gaming applications may execute to use the portable information handling system 14 processing resources and external processing resources, such as a desktop information handling system, to generate gaming content for presentation to the end user. For instance, a gaming application executing on a separate desktop information handling system may coordinate presentation of content with portable information handling system 14 to distribute content at display 12 and integrated touchscreen display 18. In one example embodiment, controller 16 may communicate inputs only to portable information handling system 14 or may interface with other information handling systems while, for instance, portable information handling system 14 supports communication functions with eye gaze inputs as described in greater detail below. In the example embodiment of FIG. 2, portable information handling system 14 is held in a viewing orientation on the desktop support surface with an integrated stand as further described herein.

Figure 3A:
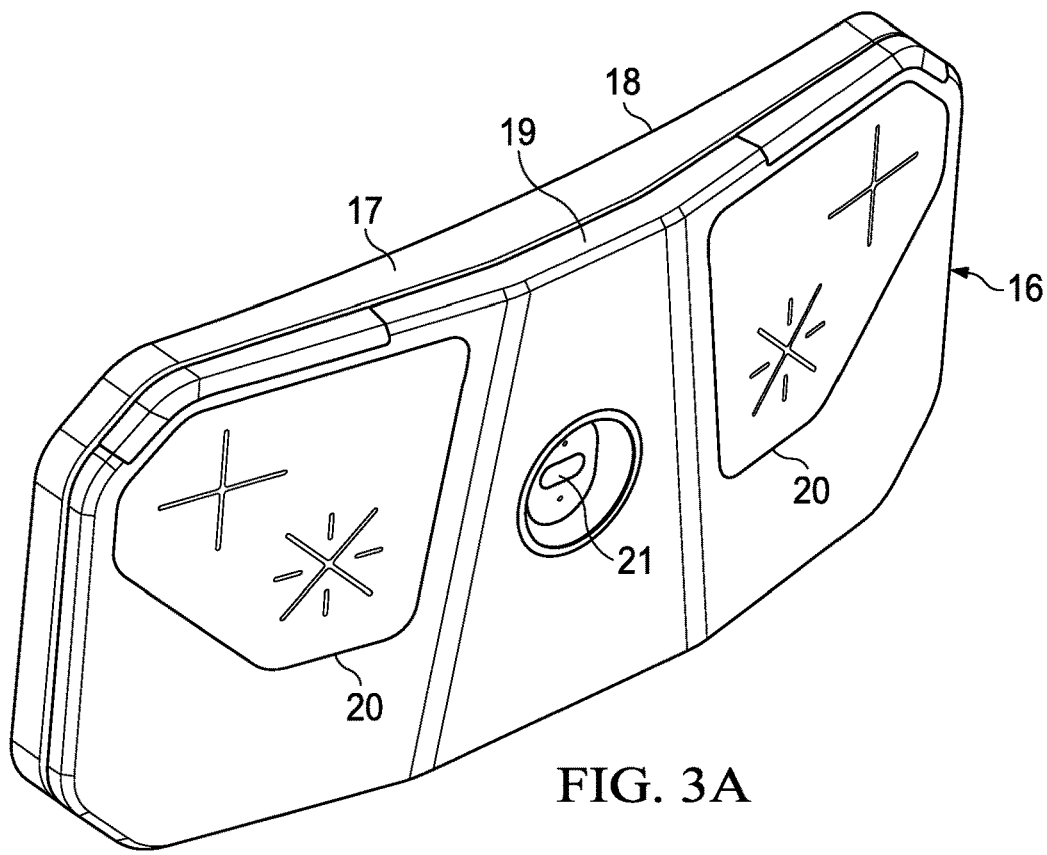
FIGS. 3A, 3B and 3C depict examples of selective coupling and de-coupling of the portable information handling system and controller.
Figure 3C:
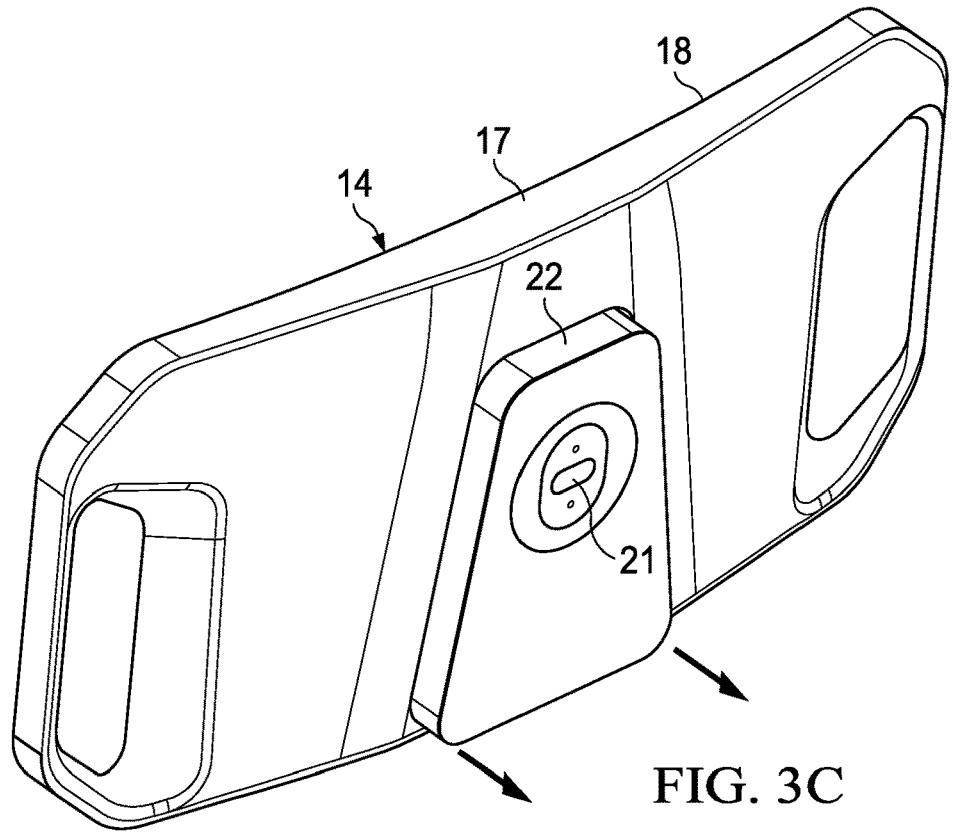
Figure 3B:
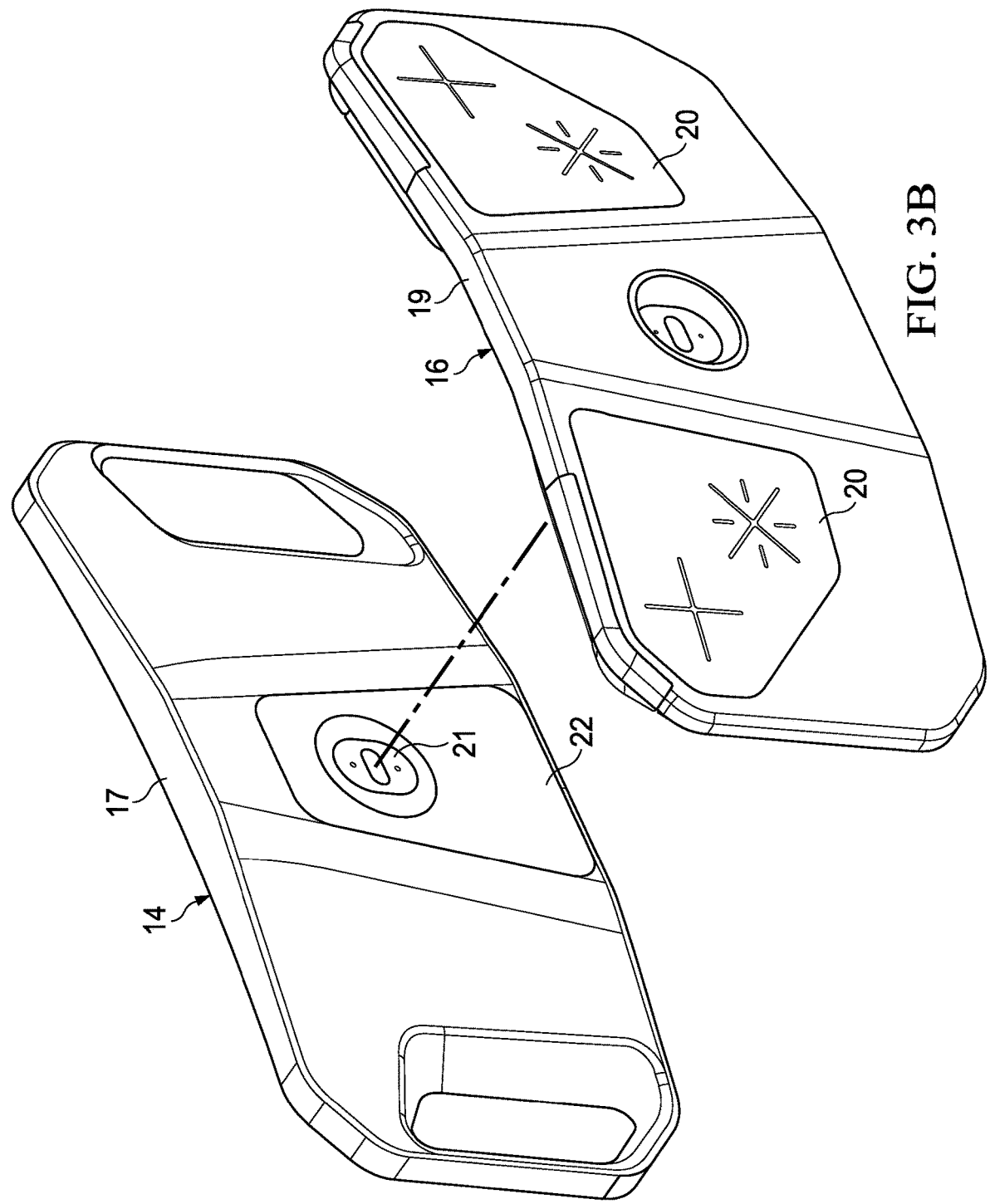

Referring now to FIGS. 3A, 3B and 3C, examples of selective coupling and de-coupling of portable information handling system 14 and controller 12 are depicted. FIG. 3A depicts portable gaming information handling system assembly 10 with a rear face of portable information handling system 10 coupled by a coupler 21 to a rear face of controller 16. Information handling system 14 has a curved rear surface of its housing 17 that conforms to a curved shape of controller 16 housing 19 so that coupler 21 holds the assembly of housings 17 and 19 in close tight proximity. In the example configuration, an end user viewing the display at the front face of information handling system 14 can access input devices 20 at the front face of controller 16 by reaching behind the assembly to make inputs. Alternatively, an end user may hold controller 16 face up to perform inputs at input devices 20 for use at a separate peripheral display, either supported by portable information handling system 14 or a separate information handling system. FIG. 3B depicts information handling system 14 separated from controller 16 by release of coupler 21. Once separated, both information handling system 14 and controller 16 operate as independent devices. In order to achieve the steering wheel configuration depicted in FIG. 1, the front face of controller housing 19 is flipped to face the rear face of information handling system housing 17 and coupler 21 couples the housings to each other so that opposing arcs of the curved housing shape provide room to rotate controller 16 relative to information handling system 14. In one example embodiment, a gimbal motor 22 extends out from information handling system 14 to provide additional space not only for rotation about the gimbal motor but also to provide room for end user interaction with input devices 20. FIG. 3C depicts gimbal motor 22 extending out of information handling system 14 where it can act as a stand to hold information handling system 14 in a viewing position, as illustrated by FIG. 2. Although the extended gimbal motor 22 provides a convenient stand when portable information handling system 14 is separated from controller 16, in alternative embodiments, gimbal motor 22 may be incorporated in controller 16 or placed as a separate unit between housings 17 and 19 when the wheel input mode is desired.

Referring now to FIG. 4, an example embodiment depicts portable information handling system 14 resting with a stand in front of a peripheral display to provide a streaming communication monitor. Streaming communication control content includes video of other gaming players 24 and control content such as a communication interface 28 for establishing text and voice communication. A three dimensional camera 30 disposed at the face of portable information handling system 14 captures inputs made by an end user, such as with eye gaze and gestures, as described in greater depth below. Peripheral display 12 presents game content 26 so that the end user can have a full field of vision without interference by game content 26. Dedicated resources of portable information handling system 14 processes images by camera 30 to present the end user without other background images. The de-coupled controller 16 provides the end user with a light weight input device to engage in game content 26 while having control information and communication tools readily available at portable information handling system 14 to integrated touchscreen display 18.

Figure 5:
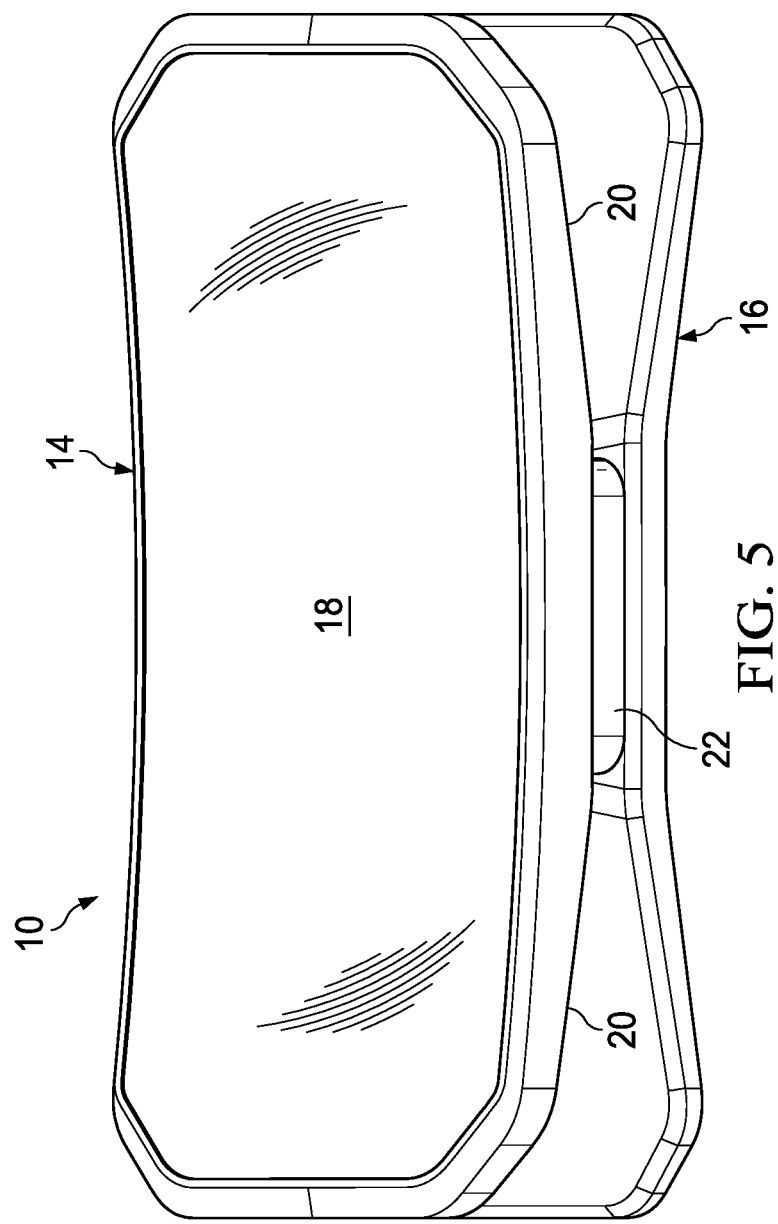
FIG. 5 depicts a side perspective view of portable gaming information handling system assembly 10 having portable information handling system 14 coupled to controller 16 in a wheel input configuration.

Referring now to FIG. 5, a side perspective view depicts portable gaming information handling system assembly 10 having portable information handling system 14 coupled to controller 16 in a wheel input configuration. In the wheel input configuration, integrated touchscreen display 18 is exposed to present gaming content to an end user who grasps controller 16 with thumbs on input devices 20. Additional input devices may be included on both sides of controller 16 so that the end user can configure inputs available at both the faces of controller 16. As the end user rotates controller 16, such as in the manner of a steering wheel, gimbal motor 22 provides a counter rotation to portable information handling system 14 so that it maintains its relative orientation. For example, an end user holding controller 16 in front of his face, as in FIG. 1, with portable information handling system 14 and display 18 in a horizontal orientation will have display 18 remain in the horizontal orientation as the end user rotates controller 16.

Figure 6:
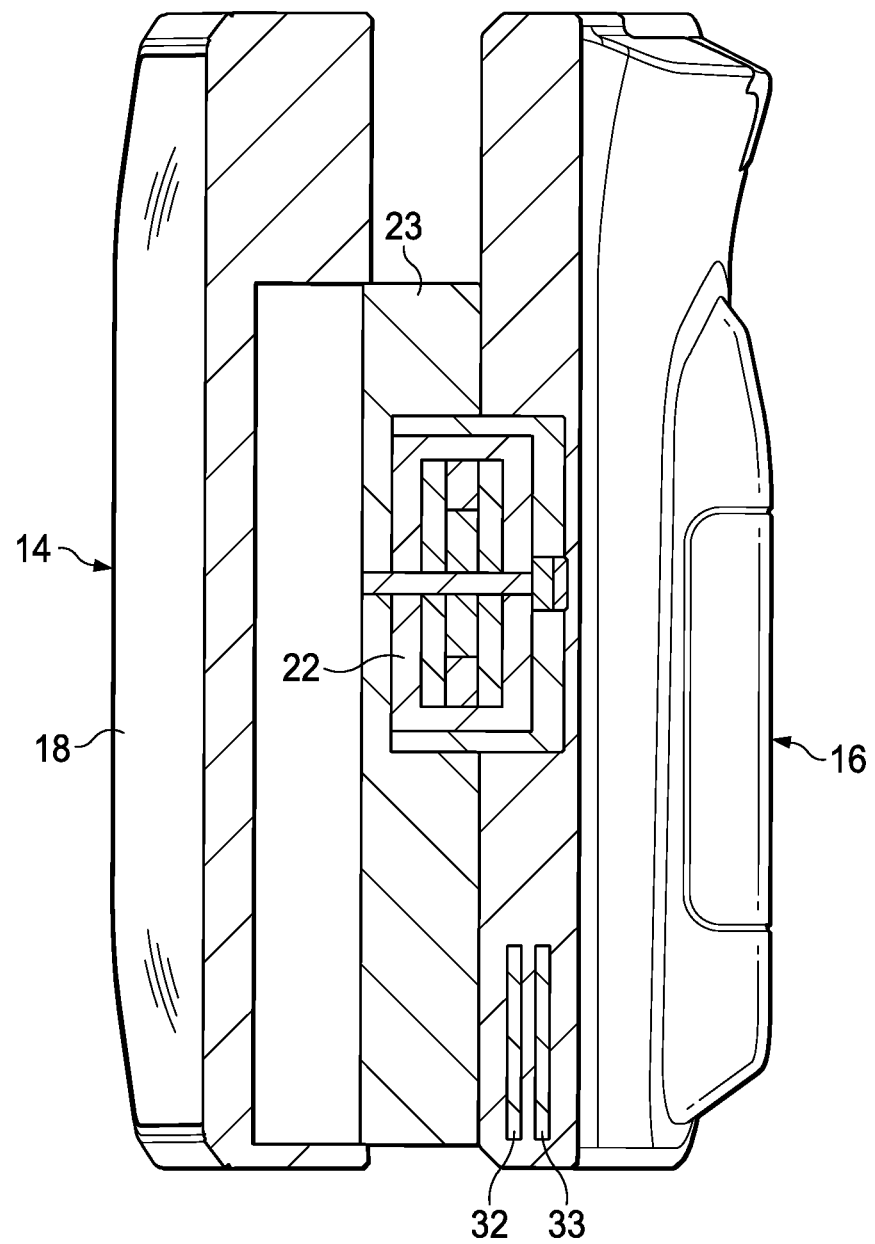
FIG. 6 depicts a side cutaway view of a gimbal motor extended from the portable information handling system to engage the controller.

Referring now to FIG. 6, a side cutaway view depicts a gimbal motor 22 extended from portable information handling system 14 to engage controller 16. In the example embodiment, gimbal motor 22 integrates into portable information handling system 14 with a sliding housing 23 that provides spacing between controller 16 and portable information handling system 14 to support rotation relative to each other. Gimbal motor 22 is, for instance, a Direct Current motor that rotates so that portable information handling system remains in a stationary relative orientation, such as by compensating for rotation introduced at controller 16. In the example embodiment, a co-processor 32 or other type of processor/controller and a gyroscope 33 interface with gimbal motor 22 to command a rotation rate that counteracts controller 16 rotation to leave portable information handling system 14 stationary. In alternative embodiments, commands for rotation of gimbal motor 22 may be provided from a processor/controller and gyroscope of portable information handling system 14 that detects rotation and commands counter rotation to keep portable information handling system at a desired orientation, such as a horizontal viewing orientation. In another example embodiment, processing and gyroscopic resources of both controller 16 and portable information handling system 14 may be combined to maintain a desired viewing orientation. For instance, controller 16 may provide rotation commands that seek to eliminate relative rotation of portable information handling system 14 while portable information handling system 14 provides rotation commands that adjust orientation relative to a fixed reference, such as gravity. In another embodiment, a camera in portable information handling system 14 may provide references to a fixed object to help maintain a relative orientation, such as the end user's face or a fixed environmental feature, such as a room light or wall.

Figure 7:
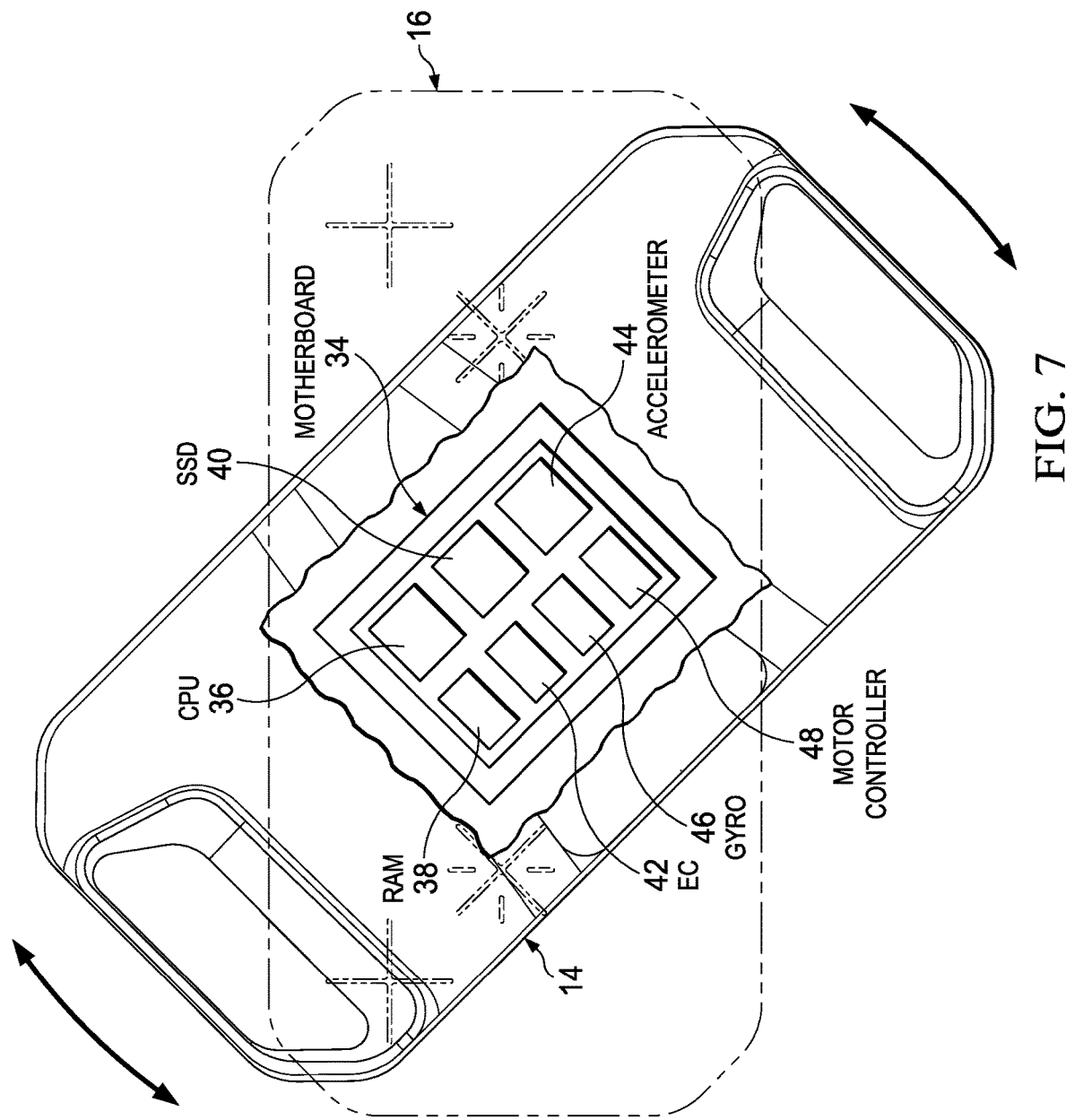
FIG. 7 depicts a cutaway view of a portable information handling system mounted on a controller providing gimbal motor counter rotation.

Referring now to FIG. 7, a cutaway view depicts a portable information handling system 14 mounted on a controller 16 providing gimbal motor counter rotation. The cutaway view depicts an example of processing components that execute gaming applications and manage gimbal motor compensation for maintaining a desired portable information handling system orientation. In the example embodiment, a motherboard 34 interfaces processing components, such as through a printed circuit board. A central processing unit (CPU) 36 executes instructions to process information in cooperation with random access memory (RAM) 38, which stores the instructions and information. A solid state drive (SSD) 40 provides non-transient memory to store an operating system and gaming application. An embedded controller 42 manages physical systems, such as power, thermals and interactions with input devices and wireless communication. A gyroscope 46 measures rotation and rotational orientation of the system and accelerometers 44 detect accelerations applied at the system. A motor controller 48 interfaces with gyroscope 46 and accelerometers 44 to apply sensed rotations and accelerations as commands to the gimbal motor for maintaining relative orientation portable information handling system 14. As described above, motor controller 48 may reside in portable information handling system 14, controller 16 and/or both. As rotation is detected as indicated by the arrows, counter rotation by the gimbal motor keeps portable information handling system 14 still relative to an end user.

In addition to supporting the wheel configuration, portable gaming information handling system assembly 10 motion and orientation sensing provides support for gesture and posture gaming control modes that extend the number of input options available to an end user. A posture interface allows changes in portable gaming information handling system assembly 10 position and angle to trigger switches between different functions while gaming. The posture interface may operate with sensors of information handling system 14, controller 16 or combined sensor inputs. By using the gyroscope and accelerometer inputs to understand the device posture and spatial position, multiple spatially aware modes are linked to applications and application modes that the user can access by adjusting device position or posture. In one example embodiment, the user plays a gaming application by holding a display 18 up vertically in a viewing position that is a default gaming user interface mode. To view a map of the game, the user tilts portable information handling system 14 from the viewing orientation down to a horizontal orientation, thus commanding a change to a map mode. In response, the gaming application is paused and a map mode is initiated. To return to the gaming user interface, the end user returns portable information handling system 14 to the vertical viewing position. In another example embodiment, an end user jerks portable information handling system 10 to a side to slide open a drawer that reveals options, such as a selection of weapons, and jerks in an opposite direction to close the slide. Within the drawer, input buttons adapt to drawer interactions, such as selection of a weapon, and then return to previous settings when the drawer is closed.

As is illustrated above in FIG. 4, separation of portable gaming information handling system assembly 10 into portable information handling system 10 and controller 16 allows portable information handling system 10 to rest on a stand in front of a peripheral display to provide streaming communication content. As an example, portable information handling system 14 generates gaming content and casts the content to peripheral display 12 while presenting at local display 18 the streaming communication and other control content on the smaller display viewing area. For example, an end user has a chat box presented at integrated touchscreen display 18 below peripheral display 12 and interacts with the chat features using eye gaze inputs captured by camera 30. In a chat mode, the end user rests his gaze on a chat target to activate a chat thread. Once activated, portable information handling system 14 dedicates resources to listen for and look at voice inputs and lip gestures to determine end user communication intent. As communication intent is detected, communication options are presented for the end user to select or ignore while continuing to interact with gaming content.

Figure 8A:
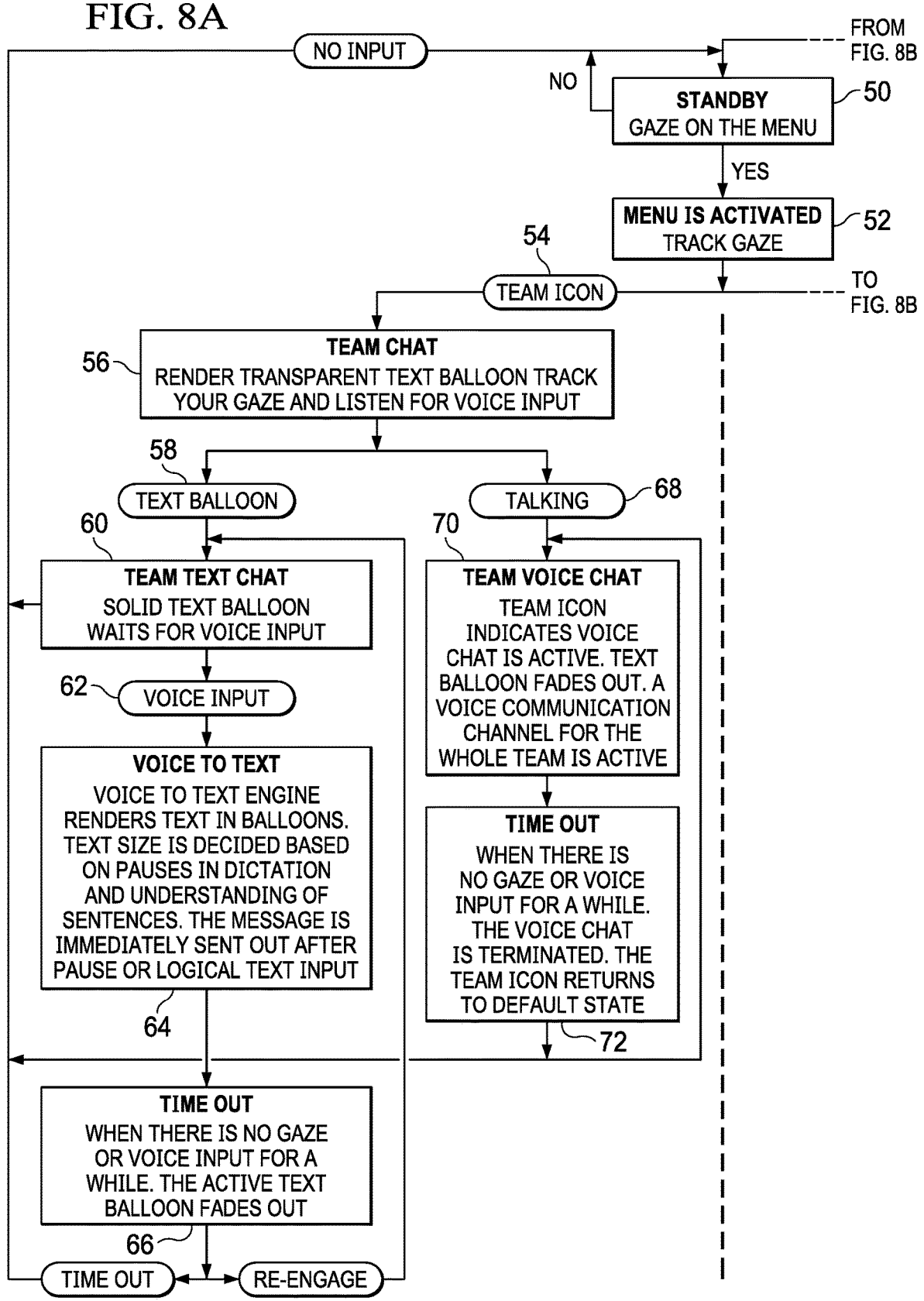

Referring now to FIGS. 8A and 8B, a flow diagram depicts logic to support a hands free voice and text chat through a streaming communication interface at a portable information handling system 14 during presentation of gaming content at a peripheral display. The process starts at step 50 in a standby state with an end user gaze detected at the communication menu. Once an end user gaze is detected, the process continues to step 52 to activate the communication menu and gaze tracking at which the end selects team communication by gaze at a team communication icon at step 54 or individual communication with a gaze at the individual communication icon at step 74. At selection of team communication, the process continues to step 56 to initiate a team communication chat interface. For instance, a transparent text balloon is opened and presented in the team chat interface and the logic monitors for user intent to determine if text or voice chat is desired, such as by monitoring for voice with a microphone or gaze with a camera. Logic to perform the voice or text chat is stored as instructions in non-transient memory, such as a solid state drive, for execution by the processor.

If at step 56 a gaze at the text balloon is detected, the process continues to step 58 to present a text balloon and initiate team text chat logic. At step 60, a team text chat solid text balloon is presented and waits for voice input to populate the balloon. At step 62 voice input is detected at a microphone and, at step 64 the voice input is converted to text input by a voice-to-text conversion engine. The translated voice is rendered in the text balloon with text size determined based upon pauses in dictation of voice and completion of sentences or statements. In one example embodiment text is communicated as chat at each completed statement or sentence. Alternatively, additional text balloons are initiated with each completed sentence or statement so that a complete message may be sent based upon an end user send command issued by voice. At step 66, after a time out period if not additional gaze or voice inputs are detected the active text balloon fades out. If at step 66 additional voice or text inputs are detected, the process returns to step 60 to continue processing the additional communications. If not, the process returns to step 50.

If at step 56 a selection of team talking is determined, the process continues to step 68 to process talking for communication as voice. The process continues to step 70 to initiate team voice chat by presenting a team voice chat icon indicating that team voice chat is active. The text balloon is removed and a voice channel is opened to transmit voice to all team members. At step 72 a time out is tracked to detect a lack of a gaze or voice input for a predetermined time. If additional gaze or voice inputs are detected, the process returns to step 70 to continue voice chat. If not, the process returns to step 50 to standby for additional chat commands as described above.

If at step 52 gaze indicates a selection for individual communication, the process continues to step 74 to initiate individual chat. At step 76 logic initiates for a private or whisper chat and a transparent text balloon is presented while gaze and voice are monitored for communication inputs. If a gaze input is detected indicating a selection of voice chat, the process continues to step 78 to initiate voice communication. At step 80 an avatar icon is presented to identify the chat recipient and the text balloon is faded out. An indication is provided for the individual voice chat activation, such as a glowing avatar and radio wave effect at a microphone symbol as voice inputs are detected. At step 82 a time out is applied to determine when voice communication is complete. If additional voice or gaze inputs are detected, the process returns to step 80 to continue with the voice chat. If additional gaze or voice inputs are not detected, the process returns to step 50 to standby for additional communication commands.

If at step 76 a gaze command is detected that indicates a selection of individual text chat, the process continues to step 84 to initiate individual text communication. At step 86 the text balloon transitions from a transparent to a solid presentation and the logic waits for voice to translate to fill the balloon. At step 88 voice input is detected from the end user and at step 90 voice to text translation logic is initiated to translate the end user voice to text. As text is translated the text engine renders the text into the text balloon with text size adjusted based upon pauses in dictation and understanding to sentence or statement completion so that the text is of an optimal size readable by the end user. Each balloon is sent as a text message based upon sentence or statement completion or a predetermined maximum size. Alternatively, the text messages are saved as a series of balloons that are sent based upon an end user command. At step 92 a time out is initiated to determine a completion of the individual text communications. If additional communications are detected the process re-engages at step 94 and returns to step 86. If the time out completes indicating completion of the text communication, the process returns to step 50 to standby for additional communications.

Figure 9:
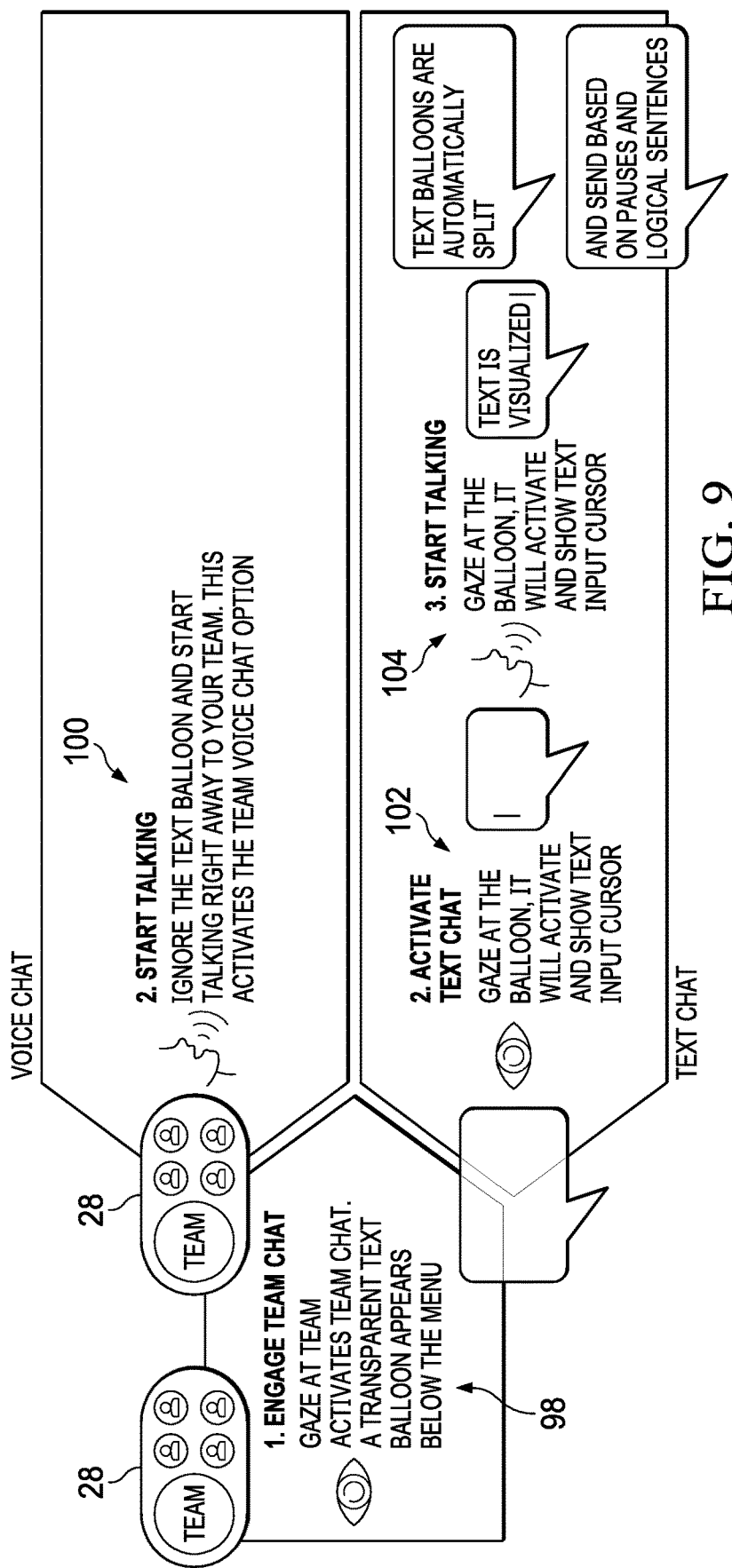
FIG. 9 depicts an example embodiment of a hands free voice and text team chat.

Referring now to FIG. 9, an example embodiment depicts a hands free voice and text team chat. The process starts at step 98 with eye gaze monitoring of communication stream interface 28 that detects selection of the team chat option. In response a team chat transparent text balloon is presented to the end user. If voice is detected, the process continues to step 100 to ignore and remove the transparent balloon a voice chat is initiated by communicating the voice to the team. If instead the end user gazes at the text balloon, the process continues to step 102 to initiate team chat by transitioning the transparent balloon to a solid presentation. At step 104 in response to voice input detection a cursor is presented in the text balloon and text is populated as the voice is translated into text. As the voice is translated and sentence or statement completion is detected, the text balloons are automatically split and communicated based upon pauses or end user voice send commands.

Figure 10:
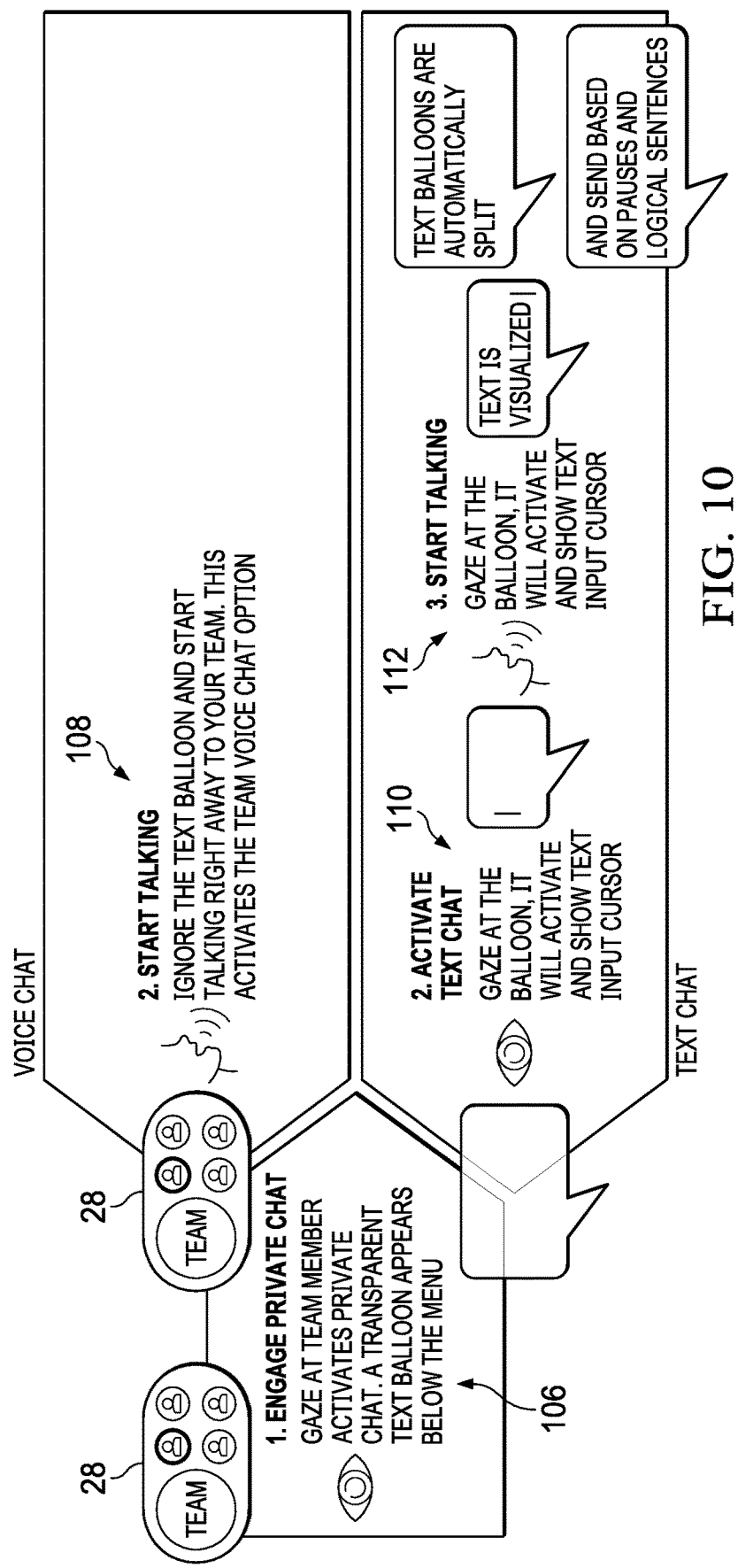
FIG. 10 depicts an example embodiment of a hands free voice and text chat for private chat and whisper.

Referring now to FIG. 10, an example embodiment depicts a hands free voice and text chat for private chat and whisper. The process starts at step 106 with eye gaze monitoring of communication stream interface 28 that detects selection of the private text/chat option, such as a gaze at an individual's icon, and a transparent text balloon is presented. If voice is detected, the process continues to step 108 and the transparent text balloon is ignored and removed while voice communication is initiated to the selected individual. If at step 106 a gaze is detected at the transparent text balloon, the process continues to step 110 to initiate text communication by transitioning the text balloon to a solid presentation. At step 110 the solid text balloon is presented with a cursor to indicate that voice will be translated to populate the text balloon. At step 112 as voice is translated to text the text populates the balloon and the text messages are automatically split and sent as voice sentences or statements are completed.

Figure 11:
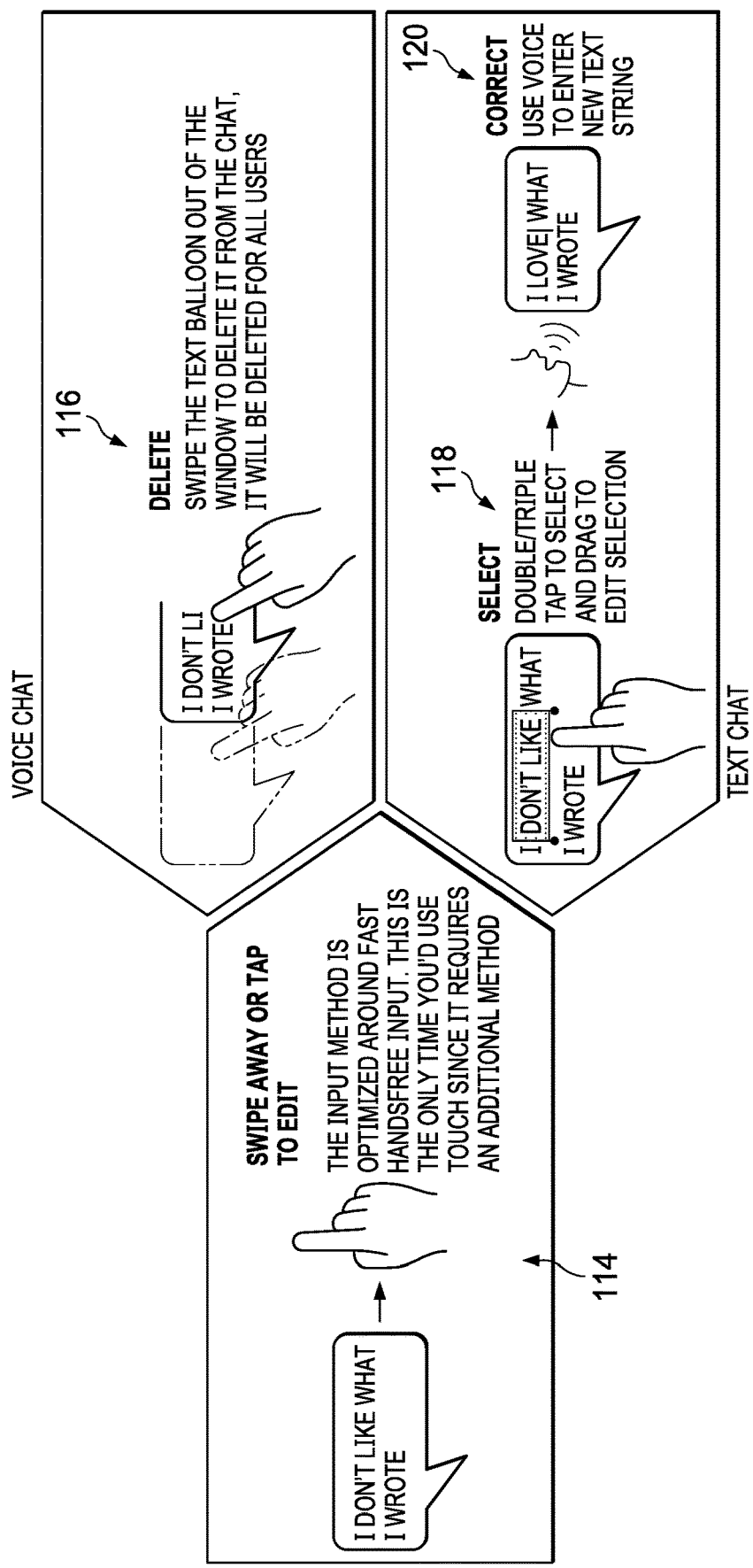
FIG. 11 depicts an example embodiment of a hands free voice and text chat for editing chat conversations.

Referring now to FIG. 11, an example embodiment depicts a hands free voice and text chat for editing chat conversations. The process starts at step 114 with an end user touch, swipe or tap at the communication interface. As an alternative, the edit process may be initiated instead with a voice command, such as "edit." At step 116 the end user may initiate a delete of the message by swiping the message to erase the text balloon. In one embodiment, a slight delay is introduced at population of a text balloon to provide the end user with an opportunity to initiate the edit process. In an alternative embodiment, a voice "delete" command may be issued by the end user to delete the text message after the edit command is issued. If instead of deleting the message the end user desires to edit the message, the process continues to step 118 where a tap at the content indicates the portion of the text message the end user desires to edit. Once the text is selected for editing, the end user voice is translated to populate the new text at step 120 and the edited message is sent.

Although the present invention has been described in detail, it should be understood that various changes, substitutions and alterations can be made hereto without departing from the spirit and scope of the invention as defined by the appended claims.

What is claimed is:

1. An information handling system comprising:
a main housing having a front surface and a rear surface;
a processor disposed in the main housing and operable to execute instructions that process information;
a memory disposed in the main housing and interfaced with the processor, the memory operable to store the instructions and the information;
a camera integrated in the main housing and interfaced with the processor, the camera operable to detect eye gaze;
a display integrated in the upper surface of the main housing and interfaced with the processor, the display operable to present the information as visual images;
a non-transient memory integrated in the main housing and storing instructions that when executed on the processor presents gaming content on a peripheral display and a communication interface on the integrated display, the communication interface presenting plural communication options associated with the gaming content, the plural communication options selectable by eye gaze inputs;
wherein the instructions respond to the eye gaze input by presenting a text bubble at the integrated display, initiates a text chat in response to voice inputs when the eye gaze input selects the text bubble, and initiates a voice chat in response to voice inputs when the eye gaze input does not select the text bubble.

2. The information handling system of claim 1 wherein:
the plural communication options comprise communication with a team of plural game participants and communication with individual members of the team;
the eye gaze input selects the team by the eye gaze directed at a team icon; and
the eye gaze input selects one of the individual members by the eye gaze input at an individual member icon.

3. The information handling system of claim 2 wherein the instructions detect a touch at the text bubble and in response to the touch edit text in the text bubble.

4. The information handling system of claim 2 wherein the instructions automatically split text messages based upon voice context into plural text messages.

5. The information handling system of claim 2 wherein the instructions present the text bubble as a transparent image until selection by the eye gaze input.

6. The information handling system of claim 2 wherein the instructions size text presented in the bubble based upon a size of a message in the bubble.

7. The information handling system of claim 1 further comprising:
a controller coupler disposed at the main housing rear surface and operable to extend and retract, the controller coupler standing the portable information handling system in a viewing position when extended; and
a controller configured to couple to the main housing rear surface and having input devices to input to the gaming content.

8. The information handling system of claim 7 wherein the controller selectively de-couples from the main housing to input to the gaming content as a peripheral controller.

9. A method for communicating with an information handling system, the method comprising:
detecting an eye gaze at a communication icon presented at a display integrated in the information handling system;
in response to the detecting, presenting a text bubble at the display;
detecting a voice at the information handling system;
populating the text bubble with text determined from the voice when an eye gaze is detected directed at the text bubble; and
initiating a voice chat with the voice when an eye gaze is not directed at the text bubble.

10. The method of claim 9 further comprising deleting the text bubble when voice chat is initiated.

11. The method of claim 10 further comprising:
presenting the text bubble initially as a transparent image; and
in response to detecting the eye gaze directed at the text bubble converting the text bubble to a full presentation.

12. The method of claim 11 further comprising:
detecting plural complete statements with the voice; and
populating a separate text bubble for each complete statement.

13. The method of claim 12 further comprising automatically sending each text bubble at detection of a complete statement.

14. The method of claim 9 further comprising:
presenting gaming application content from the information handling system to a peripheral display; and
presenting plural communication icons at the integrated display, the plural communication icons associated with players of the gaming application.

15. The method of claim 14 wherein the plural communication icons include a team icon associated with communication to plural of the players and plural individual icons each associated with an individual team member.

16. The method of claim 15 further comprising:
detecting a touch at a touch at a text bubble; and
in response to detecting the touch entering edit mode for the text bubble.

17. An information handling system comprising:
a processor operable to execute instructions; and
a non-transitory memory storing instructions that when executed on the processor present plural communication icons, detect an eye gaze at one of the plural icons, in response to the eye gaze initiate a text bubble to populate with a text communication from voice translated to text;
wherein the instructions further detect an eye gaze at the text bubble and in response populate text translated from the voice in the text bubble;
wherein the instructions further detect voice without an eye gaze directed at the text bubble and in response initiate voice chat.

* * * * *